US009135158B2

(12) United States Patent
Shirley et al.

(10) Patent No.: US 9,135,158 B2
(45) Date of Patent: Sep. 15, 2015

(54) INHERITANCE OF GROWTH PATTERNS FOR DERIVED TABLES

(75) Inventors: Brett A. Shirley, Bellevue, WA (US); Marcus E. Markiewicz, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 654 days.

(21) Appl. No.: 12/967,847

(22) Filed: Dec. 14, 2010

(65) Prior Publication Data

US 2012/0151173 A1   Jun. 14, 2012

(51) Int. Cl.
*G06F 12/02* (2006.01)
*G06F 17/30* (2006.01)

(52) U.S. Cl.
CPC ........ *G06F 12/023* (2013.01); *G06F 17/30306* (2013.01); *G06F 17/30339* (2013.01)

(58) Field of Classification Search
CPC ..... G06F 12/023; G06F 3/067; G06F 9/5016; G06F 3/0605; G06F 3/0631
USPC ........................................................ 711/170
See application file for complete search history.

(56) References Cited

U.S. PATENT DOCUMENTS

| 7,254,584 | B1 | 8/2007 | Addison, Jr. |
| 2002/0120596 | A1 | 8/2002 | Gershoff et al. |
| 2006/0184571 | A1* | 8/2006 | Liu et al. .................. 707/103 R |

OTHER PUBLICATIONS

Oracle Database SQL Reference 10g Release 2 (10.2) [published Dec. 2005] Available at http://docs.oracle.com/cd/B19306_01/server.102/b14200/clauses009.htm#i997450. Labelled as A007 NPL Oracle SQL reference.*
Oracle Database Administrator's Guide 10g Release 2 (10.2) [published Dec. 2006] Available at http://docs.oracle.com/cd/B19306_01/server.102/b14231/schema.htm#i1006922. Labelled as A008 NPL Oracle Admin guide.*
IBM Informix Version 10.0/8.5 Database Design and Implementation Guide [published 2004] Available at http://publib.boulder.ibm.com/infocenter/idshelp/v10/index.jsp?topic=/com.ibm.ddi.doc/ddi180.htm Labelled as A028 NPL Informix2.*
McLain, et al., "What is Schema Inheritance?", Jan. 1, 2001, 6 pages, http://support.novell.com/techcenter/articles/anp20010101.html.
Smith, "Implementing Table Inheritance in SQL Server", Feb. 20, 2008, 5 pages, http://www.sqlteam.com/article/implementing-table-inheritance-in-sql-server.
Byrd, "The Trouble with Templates Part I", Aug. 4, 2003, 16 pages http://ibm.com/developerworks/lotus/library/ls-Templates1/index.html.
Ambler, "Mapping Objects to Relational Databases: O/R Mapping in Detail", Retrieved Date: Oct. 22, 2010, 26 pages, http://www.agiledata.org/essays/mappingObjects.html#MapEachClassToTable.
PostgreSQL.org, "PostgreSQL 8.1.22 Documentation", Retrieved Date: Oct. 22, 2010, 4 pages http://www.dba-oracle.com/oracle_growth_monitoring.htm.

* cited by examiner

*Primary Examiner* — Charles Rones
*Assistant Examiner* — Andrew Russell
(74) *Attorney, Agent, or Firm* — Louise Bowman; Danielle Johnston-Holmes; Micky Minhas

(57) ABSTRACT

Systems and methods are disclosed in which a derived table can inherit a growth pattern from a template table. A growth pattern is used to define how memory is allocated to a table as the table grows. The derived table can inherit the growth pattern defined by its template table or it can provide an override growth pattern. Inheritance of the growth pattern can be performed by explicit copying or by reference or link. Growth patterns can be edited, and the edits can be applied universally or locally.

20 Claims, 5 Drawing Sheets

INHERITANCE OF GROWTH PATTERNS FOR DERIVED TABLES

BACKGROUND

In the past, memory has been allocated to objects in a static manner. For example, a system may allocate a fixed number of contiguous pages. When an object reaches the storage capacity of the page another fixed page size is allocated to the object. When dealing with tables, fixed memory allocation results in inefficient memory allocation, particularly in systems that store thousands or millions of tables. It is with respect to this general environment that embodiments of the present disclosure have been contemplated.

Although specific problems have been addressed in this Background, this disclosure is not intended in any way to be limited to solving those specific problems.

SUMMARY

Embodiments of the present disclosure relate to systems and methods for inheriting growth patterns for derived tables. In embodiments, a template table defines a growth pattern that can be used to control the allocation of contiguous pages in a table in order to provide better Input/Output ("I/O") performance. A derived table inherits these growth patterns, which are then used for the memory allocation of the derived tables. In other embodiments, the derived tables can specify an override growth table that is used instead of the growth pattern defined for the template table.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Figure 1:
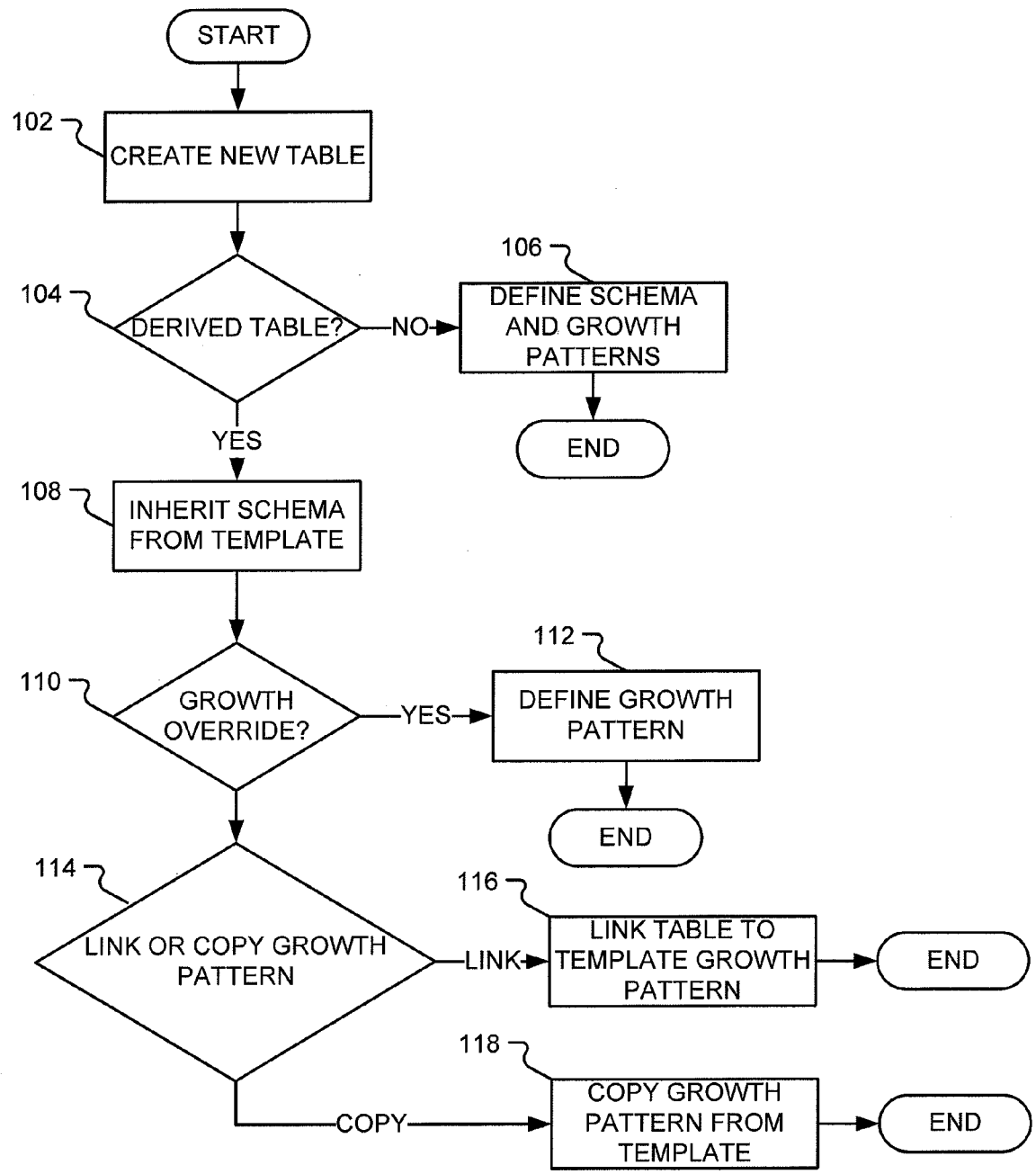
FIG. 1 illustrates an embodiment of a flowchart representing a method 100 for inheriting growth patterns in derived tables.

This disclosure will now more fully describe exemplary embodiments with reference to the accompanying drawings, in which some of the possible embodiments are shown. Other aspects, however, may be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

The various embodiments described herein generally provide systems and methods for inheriting growth patterns for derived tables. In data management systems, relational databases are often used to store and manipulate data. Relational databases organize data in table form. A table is an organizational structure organized into rows and columns. Each row is an entry in a database representing an object. Each column relates to a specific attribute of the object. Tables can have an infinite number of rows, but are limited to the columns that are described in the table's schema. A schema defines the structure of a table used in a relational database. A table's schema may be defined as a property of the table. In embodiments, a derived table is a table that inherits at least some of its characteristics from a template table. For example, a derived table may inherit its schema from a template rather than defining its own schema. Derived tables are useful in a situation in which numerous identical tables, or tables with a high degree of commonality (tables that have many similar properties) are used. For example, an e-mail server may store e-mail and account information for many different users. Each user mailbox may be stored as a table on the e-mail server. Because all of the mailboxes provide the same functionality, each table representing a mailbox will incorporate similar, or even the same, schema. Thus, rather than individually define the schema for each individual table, efficiencies are realized by defining the common schema in a single template that can be accessed each time a new mailbox table is opened or created.

In circumstances when a large number of tables are in use, issues arise in ensuring efficient memory allocation. Memory allocation can refer to both volatile and persistent memory allocation. Embodiments of the present disclosure may be practice regardless of the type of underlying memory used (e.g., the present disclosure may be practiced RAM memory, hard disk storage, solid state storage, magnetic storage systems, etc). Systems will often allocate memory in a fixed number of contiguous pages, regardless of the actual needs of the table or other object that the memory is being allocated for. Referring again to the e-mail server and mailbox example, the e-mail server may have allocated memory for a table representing every user's mailbox. In a general allocation environment, a fixed number of contiguous pages will be allocated for each mailbox. If the allocation is too small, the server will have to continually allocate extra memory for the mailbox tables. Conversely, if the allocation size is too large, the system will waste resources by allocating more memory than is needed by the mailbox.

In order to address this issue, a growth pattern can be defined for allocating memory resources. In one embodiment, the growth pattern may define a series of increased allocation sizes for memory requests. For example, a growth pattern may be defined for a table in which the table is initially allocated 4 KB memory. As entries are made to the table causing it to grow. As the size of the table reaches the current memory allocation size, the system may allocate and additional 8 KB of memory. In embodiments, reaching the current memory allocation size may comprise the size of the table reaching the actual allocation size, growing lager than the allocation size, or reaching a threshold size that causes the system to allocate additional memory. As the table continues to grow, the next allocation may consist of a 16 KB allocation, then a 32 KB allocation, and so on. By defining such a growth pattern for the table, memory can be more efficiently used than in a fixed allocation setting. While this example provides specific size requirements, one of skill in the art will appreciate that these are intended for illustrative purposes, and any number of different sizes or allocation schemes can be practiced with the systems and methods disclosed herein.

In another embodiment, a growth pattern may define other rules related to the growth of a table. For example, a growth pattern may require that the table follow an append strong rule. An append strong table is a table in which all additions to the table are added to the end of the table. In other words, in an append strong table, all entries are made in order and stored in order. Referring again to the mailbox example, a table representing a mailbox may be used to store e-mail messages. As messages are deleted, the physical storage of the table will start to develop holes. That is, there will be unused memory within the table as pieces of mail are deleted. If an append strong rule is defined in the growth pattern, new entries to the mailbox are added to the end of the storage allocation for the table. An append strong rule helps ensure the continuity of the table over time. In defining an append strong rule, a non-reuse rule may also be defined that prohibits the use of space previously occupied by a now-deleted message.

In further embodiments, the growth pattern may define a defragmentation rule to ensure the continuity of the table. Referring again to the mailbox example, if an append strong rule is in effect, as more and more e-mail messages are deleted, the physical memory storing the mailbox table will be filled with holes. The growth pattern may also define a rule that performs a defragmentation operation on the table once a threshold of holes is reached. In embodiments, the threshold of holes may be statically defined or dynamically determined based upon analysis of the table. In embodiments, once a certain number of holes are present within the physical memory allocation of the table, a defragmentation operation, such as a B-Tree defragmentation, may be performed on the table to reduce the amount of holes in the memory and maintain the contiguity of the table. While the B-Tree defragmentation has been highlighted as a specific example of defragmentation, one of skill in the art will appreciate that any type of defragmentation operation may be employed by the systems and methods disclosed herein. Furthermore, while specific examples using tables in a mailbox setting are provided, these examples are for illustrative purposes only. The systems and methods disclosed herein may be practiced regardless of the type of table or the situation in which the table is used.

The allocation efficiencies introduced by defining growth patterns are further enhanced by eliminating the need to define a growth pattern for each created or opened table. As previously discussed, table templates have been used to eliminate the need to define a schema for each table created for a similar purpose. The systems and methods disclosed herein enhance the efficiencies of growth patterns enabling the inheritance of growth patterns.

FIG. 1 is an embodiment of a flowchart representing a method 100 for creating a table with inherited growth patterns. Flow begins at operation 102 in which a command to create a new table is received by a system performing the method 100. Flow proceeds to operation 104 in which a determination is made as to whether the new table is a derived table. If the table is not a derived table, flow branches "No" to operation 106. At operation 106, a schema and growth patterns are defined for the new table. In one embodiment, the schema and growth patterns are based upon input received from a user, such as a database administrator. The defined schema and growth patterns may be saved as a property of the table, for example in a properties field, as metadata, stored in the schema, or stored in any other manner. In another embodiment, the schema and growth patterns may be provided by a process or software application that is creating the table. In embodiments, the growth pattern may specify a custom growth pattern or no growth pattern.

Figure 2:
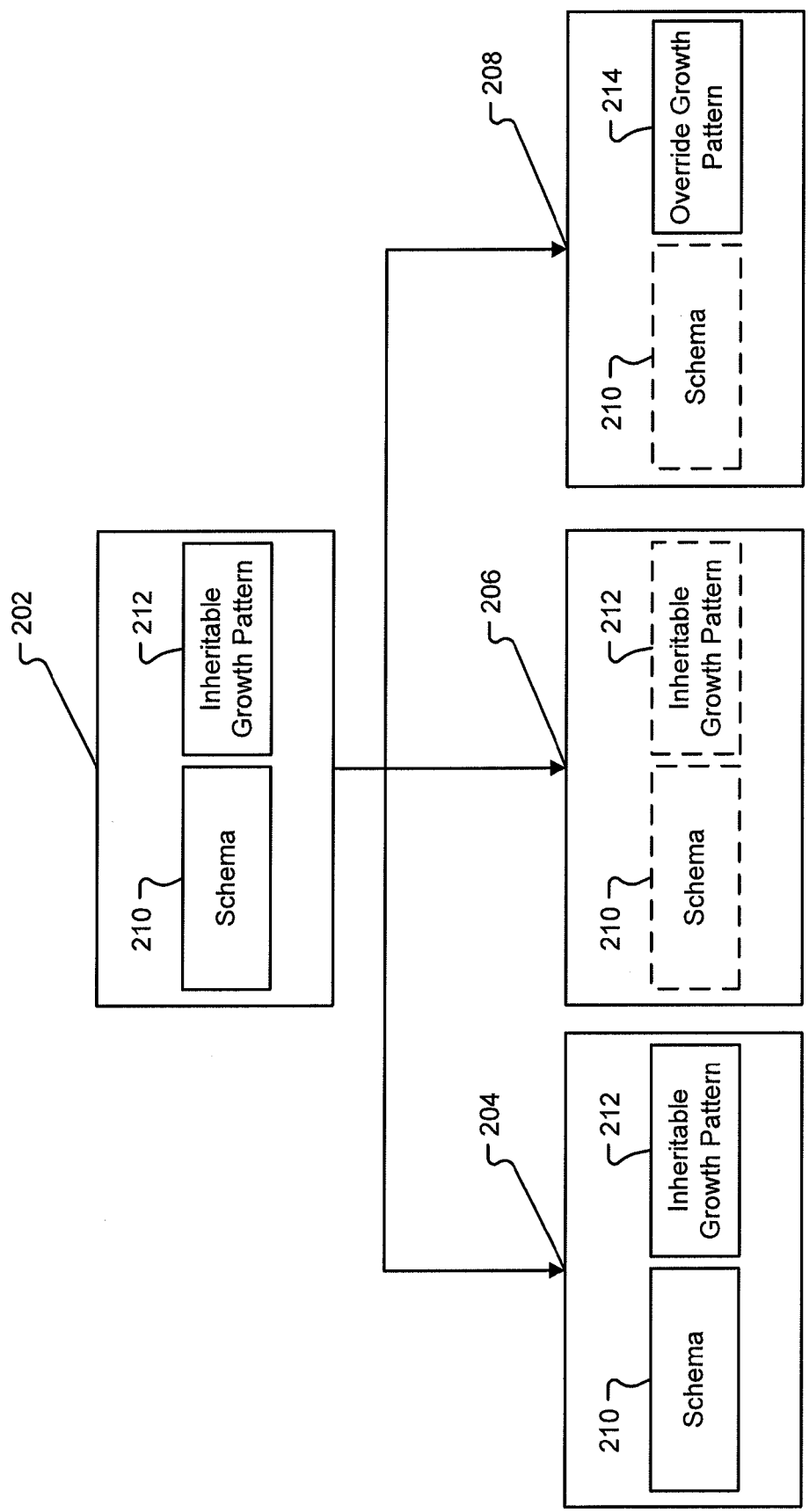
FIG. 2 illustrates various embodiments of a derived tables inheriting from a template table 202.
Figure 3:
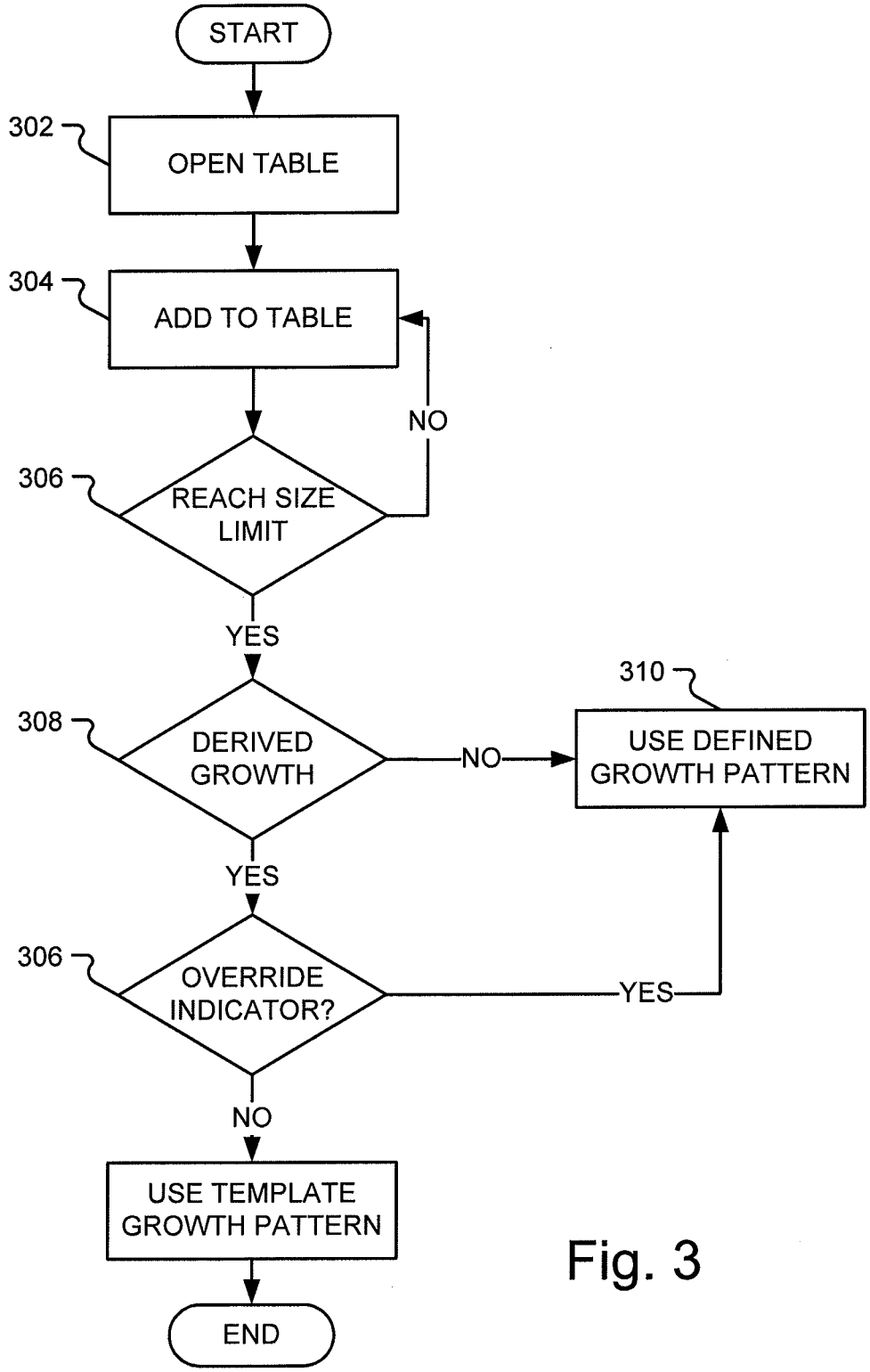
FIG. 3 is an illustration of a flowchart representing an embodiment of a method 300 for performing memory allocation to a derived table.

Returning to operation 104, if the new table is a derived table, flow branches "Yes" to operation 108. At operation 108, the new table inherits a schema from a template table. In embodiments, the template table is defined. In one embodiment, the template table is indicated by user input. In another embodiment, the template table may be indicated by a process or software application that is creating the table. In one embodiment, the table may inherit the schema by copying the template's schema into the new table's properties. In another embodiment, the new table inherits the template's schema by including a reference or a link to the template table's schema in the new table's properties. FIGS. 2 & 3 provide additional discussion on the differences between copying and linking inheritable properties.

Flow then proceeds to operation 110. At operation 110, it is determined if the new table contains a growth pattern override. In one embodiment, an indicator may be used to specify a growth pattern override. For example, the indicator may be a flag or a bit set when the new table is created. One of skill in the art will appreciate that any other types of indicators known to the art can be employed to determine if a growth pattern override is present. If the new table has a growth pattern override, flow branches "Yes" to operation 112. At operation 112, a growth pattern is defined for the new table. In one embodiment, the growth pattern is based upon input received from a user. In embodiments, the defined growth pattern is saved as a property of the table. The growth pattern may specify a custom growth pattern or no growth pattern.

If a growth pattern override is not specified for the new table, flow proceeds from operation 110 to operation 114. At operation 114 a decision is made as to whether the inherited growth pattern will be linked or copied to the new table. If the growth pattern is linked to the new table, flow proceeds to operation 116. At operation 116, the new table is provided a reference (e.g., a pointer, a link, a memory address, or any other reference mechanism known to the art) to the growth pattern defined in a template table. In embodiments, the growth pattern can be inherited from the same template table as the inherited schema or from a different template table. In embodiments, the reference may be stored in the new table's properties. As will be discussed, inheriting the growth pattern via a reference or a link provides additional benefits related to storage requirements and the updating of growth patterns.

If the growth pattern is copied from the template table, flow branches "Copy" to operation 118. At operation 118, the growth pattern defined for the template table is copied into the new table's properties.

FIG. 2 illustrates various embodiments of derived tables 204, 206, and 208 inheriting from a template table 202. In embodiments, the template table 202 defines various table characteristics and properties, such as schema 210. Additionally, the template table defines an inheritable growth pattern 212. The other tables may use template table 202 to derive characteristics and growth patterns, thus alleviating the need to recreate such aspects for every table. For example, derived table 204 contains inherited schema 210 and the inherited growth pattern 212 from the template table 202. In the illustrated embodiment, derived table 202 inherits the schema 210 and the inherited growth pattern 212 by directly copying these items from template table 202.

In another embodiment, a table may derive from the template table 202 without actually copying the template table's inheritable characteristics and/or inheritable growth pattern. Derived table 206 also inherits the schema 210 and the inherited growth pattern 212 from the template table 202. However, rather than actually copying these items, derived table 206 inherits these characteristics by linking to, or providing a pointer to, the schema 210 and the inherited growth pattern 212 in the template table 202 (indicated by the dotted boxes). Derived table 206 provides additional efficiency aspects by reducing the need to have an actual copy of schema 210 and the inherited growth pattern 212, thus reducing the amount of memory needed to store derived table 206. This is particularly useful for systems with a large amount tables, for example, an e-mail server hosting thousands or millions of mailboxes. Moreover, if a change is made to the growth pattern 212 of the template table 202, such change is reflected only when the growth pattern is actually needed for derived table 206 (e.g., when table 206 needs additional space). Derived table 208 illustrates an example in which the table inherits the schema 210 from the template table; however derived table 208 provides its own override growth pattern 214 which is defined specifically for derived table 208. In this embodiment, the override growth pattern is provided by a link to a different table's growth pattern (as indicated by the dotted lines).

FIG. 3 is an illustration of a flowchart representing an embodiment of a method 300 for performing memory allocation to a derived table. Flow begins at operation 302. In operation 302 a table is opened. In an embodiment, a device opening a table loads the table into working memory, such as, but not limited to, the device's RAM. Flow proceeds to operation 304 in which additions are made to the table. For example, at operation 304 additional entries are added to the table causing the table to grow in size and therefore consume more of the memory allocated to the table.

Flow proceeds to operation 306 in which a determination is made as to whether the table has reached its size limit. In embodiments, the size limit for the table may be the memory allocated to the table. If the table has not reached is size limit, flow branches "No" and returns to operation 304 and additional entries are made to the table. If the table reaches its size limit, flow branches "Yes" to operation 308. At operation 308, instead of the following a default system procedure for allocating additional memory, a determination is made as to whether the table derived a growth pattern. If the table did not derive its growth pattern, flow branches "No" to operation 310. At operation 310, a growth pattern defined in the table's properties is read and the memory is allocated accordingly. In one embodiment, the growth pattern may be defined in the table's properties, in metadata, in the schema, or in any other manner. In such an embodiment, the default system procedure is used to allocate additional memory. If the table's growth pattern is derived, flow branches "Yes" to operation 312. At operation 312, a determination is made as to whether the growth pattern is inherited via a reference or a link. If the growth pattern is not inherited by reference then flow branches "No" to operation 310, the inherited growth pattern defined in the table's properties is read and the memory is allocated accordingly.

If the growth pattern is inherited via a reference, flow branches "Yes" from operation 312 to 314. At operation 314, the template's growth pattern referenced by the table is accessed and read and the memory is allocated accordingly. Inheriting growth patterns by reference provides memory saving benefits by allowing a large number of tables to reference a single definition of a growth pattern rather than requiring each table to provide its own copy of the reference. Moreover, when a template growth pattern is changed or edited, the edits need not be propagated immediately to tables that have inherited that growth pattern by link because the edits will be reflected when the growth pattern is actually used by the derived tables.

Figure 4:
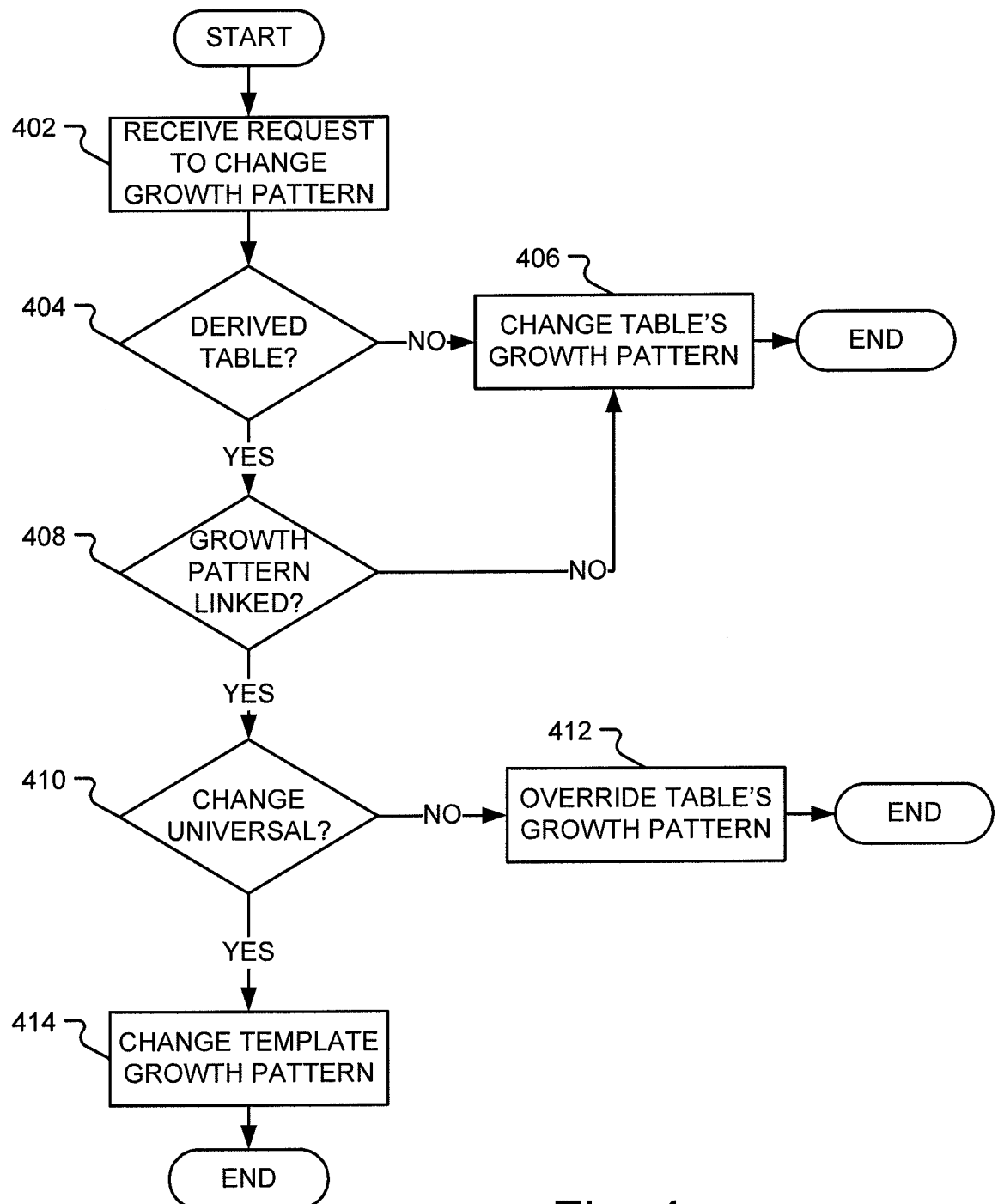
FIG. 4 is an illustration of flowchart representing an embodiment of a method 400 for editing the growth pattern of a derived table.

FIG. 4 is an illustration of flowchart representing an embodiment of a method 400 for editing the growth pattern of a derived table. Flow begins at operation 402 where the method receives request to change the growth pattern of a table. Flow continues to operation 404 where a determination is made as to whether the table requesting the edit is a derived table. If the table is not a derived table, flow branches "No" to operation 406 where the growth pattern defined in the table's properties is modified. In one embodiment, the growth pattern is changed according to user input. In another embodiment, the growth pattern is modified according to instruction received from a process or a software application requesting the modification.

If the table is a derived table, flow continues from operation 404 to 408. At operation 408 a determination is made as to whether the growth pattern is inherited via reference. If the growth pattern is not inherited via reference or link (e.g., the inherited growth pattern is copied or the derived table provides a growth pattern override) flow branches "No" to operation 406 and the local copy of the growth pattern is modified.

Returning to operation 408, if the growth pattern is inherited by reference or link, flow branches "Yes" to operation 410. At operation 410 a determination is made as to whether the requested modification is a universal modification. If the change is not universal, flow branches "No" to operation 412 in which the modification is made to the local properties of the derived table. In embodiments, the current growth pattern of the template table is copied locally and then modified. In embodiments, the derived table's override indicator is then set at operation 412. In embodiments, the reference to the template table's growth pattern that is stored in the derived table's properties is overridden by a modified growth pattern. The modified growth pattern may be provided by user input or by instruction from a process or application requesting the change to the growth pattern.

If the request is for a universal change, flow branches "Yes" to operation 414. At operation 414 the derived table's reference to the template table's growth pattern remains intact; however, the growth pattern at the template table is modified. The modifications may be provided by user input or by instruction from a process or application requesting the change to the growth pattern. Although not shown in FIG. 4, in such an embodiment the authorization of the user and/or software application requesting the change are checked before making the modification to the template's growth pattern. Because modifying the changes to the template's growth pattern affects all new derived tables that inherit from the template and all older derived table's that inherit the template's growth pattern by reference, the method 400 verifies that the user and/or software application requesting the change is authorized to do so.

Modifying the template's growth pattern provides an efficient way to modify the growth pattern of a large number of derived tables. For example, tables that have similar uses and growth patterns can derive their growth pattern from the same template by reference. If the growth pattern needs to be updated in the future, a single modification to the template's growth pattern is propagated to all of the derived tables.

Figure 5:
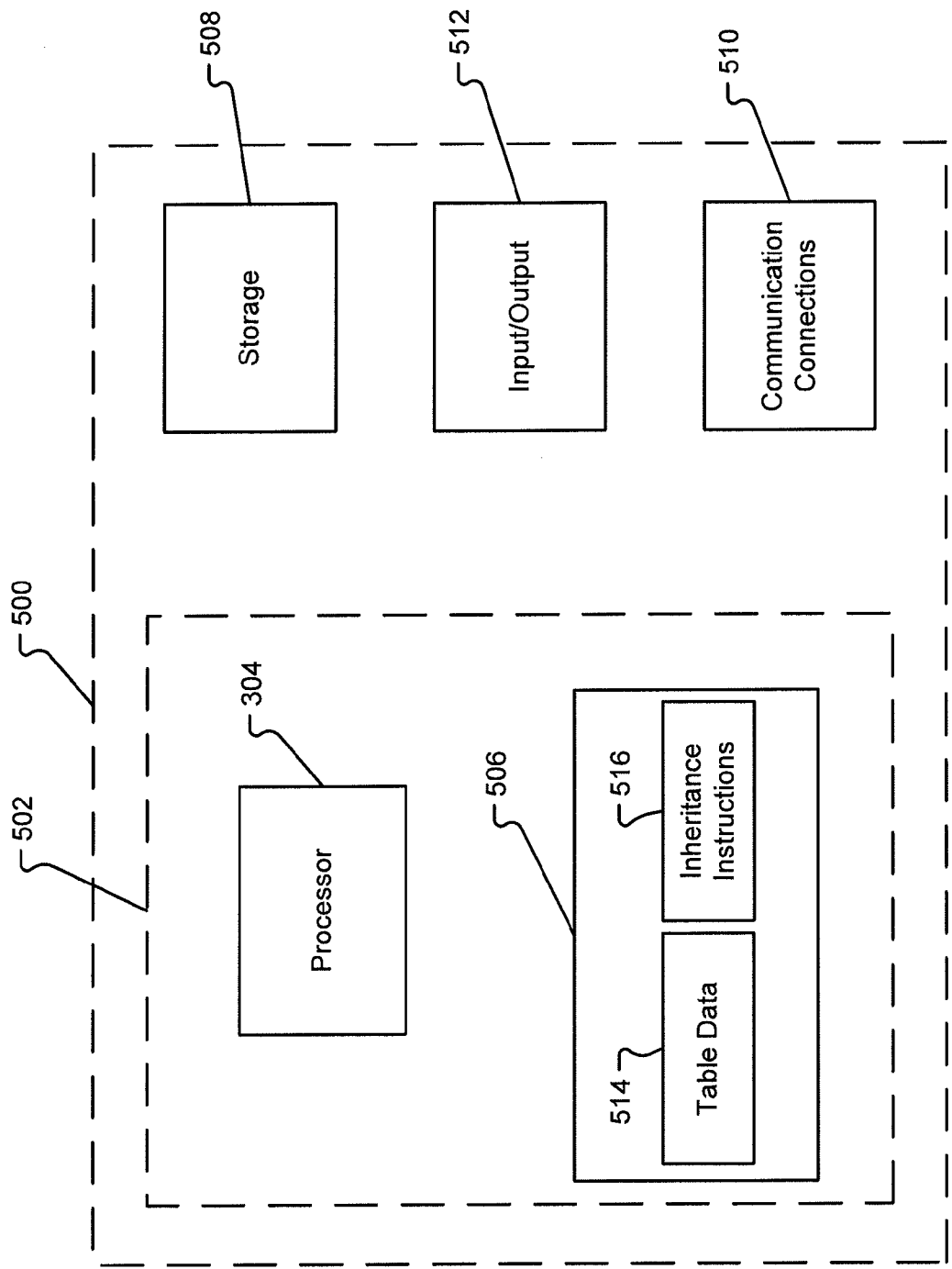
FIG. 5 illustrates an embodiment of a computer environment and computer system 500 for implementing the methods disclosed herein.

With reference to FIG. 5, an embodiment of a computing environment for implementing the various embodiments described herein includes a computer system, such as computer system 500. Any and all components of the described embodiments may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 500 comprises at least one processing unit or processor 504 and system memory 505. The most basic configuration of the computer system 500 is illustrated in FIG. 5 by dashed line 502. In some embodiments, one or more components of the described system are loaded into system memory 505 and executed by the processing unit 504 from system memory 506. Depending on the exact configuration and type of computer system 500, system memory 506 may be volatile (such as RAM), non-volatile (such as ROM, flash memory, etc.), or some combination of the two.

Additionally, computer system 500 may also have additional features/functionality. For example, computer system 500 includes additional storage media 508, such as removable and/or non-removable storage, including, but not limited to, magnetic or optical disks or tape. In some embodiments, software or executable code and any data used for the described system is permanently stored in storage media 508. Storage media 508 includes volatile and non-volatile, removable and non-removable media implemented in any method or technology for storage of information such as computer readable instructions, data structures, program modules, or other data. In embodiments, the disclosed template and derived tables are stored in storage media 508.

System memory 506 and storage media 508 are examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage, other magnetic storage devices, or any other medium which is used to store the desired information and which is accessed by computer system 500 and processor 504. Any such computer storage media may be part of computer system 500. In embodiments, system memory 505 and/or storage media 508 stores data used to perform the methods and/or form the system(s) disclosed herein, such as, creating a derived table and performing a method of inheriting growth patterns. In embodiments, system memory 506 stores information such as tables and table data 514 and inheritance instructions 516 for performing a method of inheriting growth patterns as discussed with respect to FIGS. 1-4.

Computer system 500 may also contain communications connection(s) 510 that allow the device to communicate with other devices. In embodiments, communications connection(s) 510 may be used to transmit and receive messages between sender devices, intermediary devices, and recipient devices. Communication connection(s) 510 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media.

In some embodiments, computer system 500 also includes input and output connections 512, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 512 are used to display the information as described herein. All these devices are well known in the art and need not be discussed at length here.

In some embodiments, the component described herein comprise such modules or instructions executable by computer system 500 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 500 is part of a network that stores data in remote storage media for use by the computer system 500.

This disclosure described some embodiments with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present disclosure. Therefore, the specific structure, acts, or media are disclosed only as illustrative embodiments. The disclosure is defined by the appended claims.

What is claimed is:

1. A computer-implemented method of inheriting growth patterns for a derived table from a template table, the method comprising:

associating an inheritable growth pattern of the template table with the derived table, wherein associating the inheritable growth pattern of the template table comprises storing a link to the inheritable growth pattern in properties of the derived table, and wherein storing the link comprises writing a pointer to the schema and the inheritable growth pattern of the template table in the properties of the derived table, and wherein the link is referenced to determine the inheritable growth pattern when additional storage is allocated;

adding entries to the derived table, wherein addition of the entries causes the derived table reach an allocated storage size;

allocating first additional storage for the derived table, wherein the first additional storage is allocated according to the inheritable growth pattern;

receiving a modification the inheritable growth pattern of the derived table;

determining whether the modification is a universal modification;

when the modification is a universal modification, modifying the inheritable growth pattern of the template table to create a new inheritable growth pattern; and when the first additional storage is consumed, allocating second additional storage for the derived table, wherein the second additional storage is allocated according to the modified inheritable growth pattern, and wherein the second additional storage has a size different than the first additional storage.

2. The computer-implemented method of claim 1, wherein the inheritable growth pattern defines no growth pattern.

3. The computer-implemented method of claim 1, wherein the inheritable growth pattern comprises an append strong table rule.

4. The computer-implemented method of claim 1, wherein the inheritable growth pattern comprises a non-reuse rule for deleted space in the derived table.

5. The computer-implemented method of claim 4, wherein the inheritable growth pattern further comprises a defragmentation rule.

6. The computer-implemented method of claim 5, wherein the defragmentation rule comprises the steps of:
  determining that a specified threshold of holes are present in a physical storage for the derived table; and
  defragmenting the physical storage for the derived table.

7. The computer-implemented method of claim 1, further comprising:
  determining whether the derived table has an override growth pattern; and
  when the derived table has the override growth pattern, associating the override growth pattern with the table.

8. The computer-implemented method of claim 7, further comprising:
  when the derived table does not have the override growth pattern, associating the inherited growth pattern with the derived table.

9. A system for inheriting growth patterns for a derived table from a template table, the system comprising:
  at least one processor; and
  a memory coupled to the at least one processor, the memory comprising computer executable instruction that, when executed by the at least one processor, perform a method of:
  associating an inheritable growth pattern of the template table with the derived table, wherein associating the inheritable growth pattern of the template table comprises storing a link to the inheritable growth pattern in properties of the derived table, and wherein storing the link comprises writing a pointer to the schema and the inheritable growth pattern of the template table in the properties of the derived table, and wherein the link is referenced to determine the inheritable growth pattern when additional storage is allocated;
  adding entries to the derived table, wherein addition of the entries causes the derived table reach an allocated storage size; and
  allocating first additional storage for the derived table, wherein the first additional storage is allocated according to the inheritable growth pattern;
  receiving a modification the inheritable growth pattern of the derived table;
  determining whether the modification is a universal modification;
  when the modification is a universal modification, modifying the inheritable growth pattern of the template table to create a new inheritable growth pattern; and
  when the first additional storage is consumed, allocating second additional storage for the derived table, wherein the second additional storage is allocated according to the modified inheritable growth pattern, and wherein the second additional storage has a size different than the first additional storage.

10. The system of claim 9, wherein the inheritable growth pattern defines no growth pattern.

11. The system of claim 9, the method further including:
  receiving data to be stored in the derived table;
  determining that a threshold size limit has been reached; and
  increasing the size of the derived table according to the inheritable growth pattern.

12. The system of claim 9, wherein the inheritable growth pattern comprises an append strong table rule.

13. The system of claim 9, wherein the inheritable growth pattern comprises a non-reuse rule for deleted space in the derived table.

14. The system of claim 13, wherein the inheritable growth pattern further comprises a defragmentation rule.

15. The system of claim 14, wherein the defragmentation rule comprises the steps of:
  determining that a specified threshold of holes are present in a physical storage for the derived table; and
  defragmenting the physical storage for the derived table.

16. A computer readable medium comprising computer executable instructions that, when executed by a processor, perform a method of inheriting growth patterns for a derived table from a template table, the method comprising:
  determining if the derived table has an override growth pattern;
  when the derived table does not have an override growth pattern, associating an inheritable growth pattern of the template table with the derived table, wherein associating the inheritable growth pattern of the template table comprises storing a link to the inheritable growth pattern in properties of the derived table, and wherein storing the link comprises writing a pointer to the schema and the inheritable growth pattern of the template table in the properties of the derived table, and wherein the link is referenced to determine the inheritable growth pattern when additional storage is allocated;
  adding entries to the derived table, wherein addition of the entries causes the derived table reach an allocated storage size;
  allocating first additional storage for the derived table, wherein first additional storage is allocated according to the inheritable growth pattern;
  receiving a modification the inheritable growth pattern of the derived table;
  determining whether the modification is a universal modification;
  when the modification is a universal modification, modifying the inheritable growth pattern of the template table to create a new inheritable growth pattern; and
  when the first additional storage is consumed, allocating second additional storage for the derived table, wherein the second additional storage is allocated according to the modified inheritable growth pattern, and wherein the second additional storage has a size different than the first additional storage.

17. The computer readable medium of claim 16, further comprising:
  receiving a request to make edits the inheritable growth pattern of the derived table;

determining whether the edits to the inheritable growth pattern are to be universal;

when the edits are to be universal, receiving the edits and applying them to the template table growth pattern; and when the edits are to be local, receiving the edits and applying the edits to the derived table.

18. The computer readable medium of claim 17, wherein, when the edits are to be local, the method further comprising setting a growth pattern override flag in the properties of the derived table.

19. The computer readable medium of claim 17, wherein when the edits are to be universal, the method further comprising determining whether a user is permitted to make universal edits before applying the edits to the properties of the template table.

20. The computer readable medium of claim 18, wherein setting the growth pattern override flag creates a local modified growth pattern.

* * * * *